US008190715B1

(12) United States Patent
Narayanaswamy et al.

(10) Patent No.: US 8,190,715 B1
(45) Date of Patent: May 29, 2012

(54) SYSTEM AND METHODS FOR REMOTE AGENT INSTALLATION

(75) Inventors: Arun Narayanaswamy, Westborough, MA (US); Tudor Hulubei, Cork (IE)

(73) Assignee: EMC Corporation, Hopkinton, MA (US)

( * ) Notice: Subject to any disclaimer, the term of this patent is extended or adjusted under 35 U.S.C. 154(b) by 1645 days.

(21) Appl. No.: 11/025,580

(22) Filed: Dec. 29, 2004

(51) Int. Cl.
*G06F 15/177* (2006.01)
(52) U.S. Cl. .................. 709/220; 709/221; 709/222
(58) Field of Classification Search ........... 709/220–222
See application file for complete search history.

(56) References Cited

U.S. PATENT DOCUMENTS

| 6,108,420 | A  | * | 8/2000  | Larose et al.  | 705/59  |
|-----------|----|---|---------|----------------|---------|
| 6,282,711 | B1 | * | 8/2001  | Halpern et al. | 717/175 |
| 6,324,691 | B1 | * | 11/2001 | Gazdik         | 717/178 |
| 6,505,238 | B1 | * | 1/2003  | Tran           | 709/208 |
| 6,681,391 | B1 | * | 1/2004  | Marino et al.  | 717/175 |
| 6,970,565 | B1 | * | 11/2005 | Rindsberg      | 380/270 |
| 7,228,417 | B2 | * | 6/2007  | Roskind        | 713/168 |
| 2003/0138089 | A1 | * | 7/2003 | Sawada et al. | 379/210.01 |

* cited by examiner

*Primary Examiner* — Brian P Whipple
(74) *Attorney, Agent, or Firm* — Krishnendu Gupta; Gerald P. Kazanjian

(57) ABSTRACT

A storage area network push install performs SAN agent installation on a plurality of hosts according to a host install list. The target hosts may employ different operating systems, or platforms, and the installer selectively copies an install kit corresponding to the operating system on the target host The install kit includes an agent specific install script for identifying agent specific parameters on the target host. The installer initiates and remotely responds to the execution of the install script, or configuration script, in lieu of manual intervention by an operator, to provide the agent specific parameters for the agents being installed on the target host. The execution of the install script generates an agent initialization file for installing the agents in the appropriate locations on the target system. The agent initialization file establishes folders for locating the agent executable files and associated support files, as well as other runtime parameters.

22 Claims, 6 Drawing Sheets

SYSTEM AND METHODS FOR REMOTE AGENT INSTALLATION

BACKGROUND OF THE INVENTION

In a managed information environment, such as a local area network (LAN), a large number of individual nodes (i.e. computers) typically interconnect to exchange programs and data in the course of serving a user community. Each of the nodes executes, or performs, one or more software processes, which are memory based entities based on a programmed sequence of coded instructions, typically stored as a program file, or executable. Each of the conventional processes is started by executing the program file, including reading the coded instructions from storage, loading them into memory, and commencing execution. Typically, the execution is responsive to direct or indirect user instructions to initiate a certain task which the executables are operable to perform. In a conventional storage area network, for example, the executables often correspond to agent processes (agents) which monitor and manage various entities in the LAN. In a typical LAN, there may be many conventional nodes each executing multiple agents. The agents are responsive to a conventional management application, such as a Simple Network Management Protocol application or other suitable control program, executing on a conventional server node connected to the other nodes in the LAN, typically called hosts. Such a LAN configured for interconnection between a plurality of storage arrays and the hosts and agents which manage them is often referred to as a storage area network (SAN).

SUMMARY

A typical conventional storage area network (SAN) includes storage devices, connectivity devices, and host devices. Storage devices, such as disk arrays, integrate a plurality of mass storage elements such as disk drives for high volume data storage. Connectivity devices, such as switches, interconnect the disk arrays for accessing and retrieving the stored data and transporting it to user community connected to the SAN for such data retrieval services. Host devices manipulate and manage the storage devices and connectivity devices to maintain throughput at an optimal level. The host devices are computers which execute software entities called agents responsible for a particular type of manageable entity, such as storage arrays and connectivity devices. Further, other manageable entities, such as databases, forwarding engines, fiber channel interfaces, and others, also exist within the SAN. Each of the manageable entities may be responsive to a managing agent software process, or agent. Further, the agents are typically responsive to a SAN management application responsible for oversight and management of collective SAN operation. Accordingly, in a large SAN, there may be many different agents executing on a plurality of hosts to manage and maintain the manageable entities in the SAN.

Prior to executing, or running, the agents on the host, an installation procedure occurs which transfers the code, data and associated startup files to the host and stores the files in the appropriate location for execution. Each host expects a particular configuration, including the operating system, or platform, which the host operates under, the agents which the host is to execute, and certain agent specific parameters such as IP addresses, folder locations and available resources. Depending on these configuration variables, the conventional installation process may be complex, involving manual operator intervention at multiple steps. Further, there may be many such nodes, each requiring an install according to the above variables.

Configurations of the invention are based, in part, on the observation that conventional agent installation in a large network involves manually copying files depending on the particular operating system, performing a login/authentication sequence at each host, and specifying agent specific parameters concerning the particular host, typically via a script which is also determined by the operating system. Accordingly, an agent install involving a large number of hosts can be a time-consuming, arduous, and error prone task if the improper files are transferred or stored in the wrong location. It would be beneficial to develop an agent install mechanism which allows identification of the hosts for installation, identifies the operating system in use and retrieves the corresponding files, transfers the files according to a common authentication mechanism applicable to all hosts, and automatically responds to an install script to populate the agent specific parameters applicable to each host. In this manner, a human operator need only select from a list of hosts to identify a candidate host set and initiate the installation, without manually copying, logging into, or responding to an initialization query at each of the candidate hosts for installation.

Accordingly, configurations discussed herein perform SAN agent installation via a remote push install on a plurality of hosts according to a predetermined host install list. The target hosts may each employ different operating systems, and an installer on the server selectively copies an install kit corresponding to the operating system on the target host (i.e. SAN node). The install kit includes an agent specific install script for identifying agent specific parameters on the target host. The installer initiates and remotely responds to the execution of the install script, or configuration script, in lieu of manual intervention by an operator, to provide the agent specific parameters for the agents being installed on the target host. The execution of the install script generates an agent initialization file for installing the agents in the appropriate locations on the target system. The agent initialization file establishes, for example, folders (i.e. directories) for locating the agent executable files and associated support files, runtime parameters such as a heartbeat (i.e. keep alive) message frequency, and the IP address of the management server, to name several. The agent initialization file, therefore, starts and executes the agents in the install kit, from the appropriate locations and with the agent specific parameters, according to the generated agent initialization file. In this manner, a SAN operator need only provide the list of target host names and the installer effects installation and startup of each of the listed agents without manual intervention.

In further detail, the method for remotely configuring agents in a storage area network discussed further below includes selectively copying an install suite to a host candidate for installation, in which the install suite includes an agent specific install script. The host runs (executes) the install script as an install daemon while the server remotely responds to execution of the agent specific install script by populating host specific fields corresponding to the host candidate from the remote server. Therefore, the agent specific install script is operable for interactive response, and a configuration process (on the server) responds remotely by providing the host specific fields applicable to a requested interactive response in an automated manner. The install daemon generates an initialization file from the execution of the install script, and the server commences an agent install utility to install executable entities from the install suite to the host candidate, in which installing includes integrating host specific fields from the execution of the agent specific install script with the executable entities in install locations on the host candidate (i.e. a host repository). In a typical arrangement, remote push installation occurs on a plurality of hosts, in which an operator or user first selects a plurality of hosts as target candidates hosts, and the SAN management application repeats the copying, responding, and commencing of the install utility for each of the host candidates.

In particular configurations, the SAN management application employs common login access control into to each of the host candidates using a set of credentials common to each of the host candidates by accessing a central directory to obtain the common credentials for accessing each of the plurality of host candidates.

Particular arrangements employ different operating systems on different hosts, in which selectively copying includes determining an operating system corresponding to the host candidate and identifying, based on the determined operating system, a corresponding install suite. The server, via the SAN management application, authenticates itself with each of the target host systems for authorized access to the target host candidates for installing. Such authenticating may include connecting to each target host candidate using a secure shell (SSH) protocol, and obfuscating host specific data transferred via the secure connection.

The invention as disclosed above is described as implemented on a computer having a processor, memory, and interface operable for performing the steps and methods as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that, when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
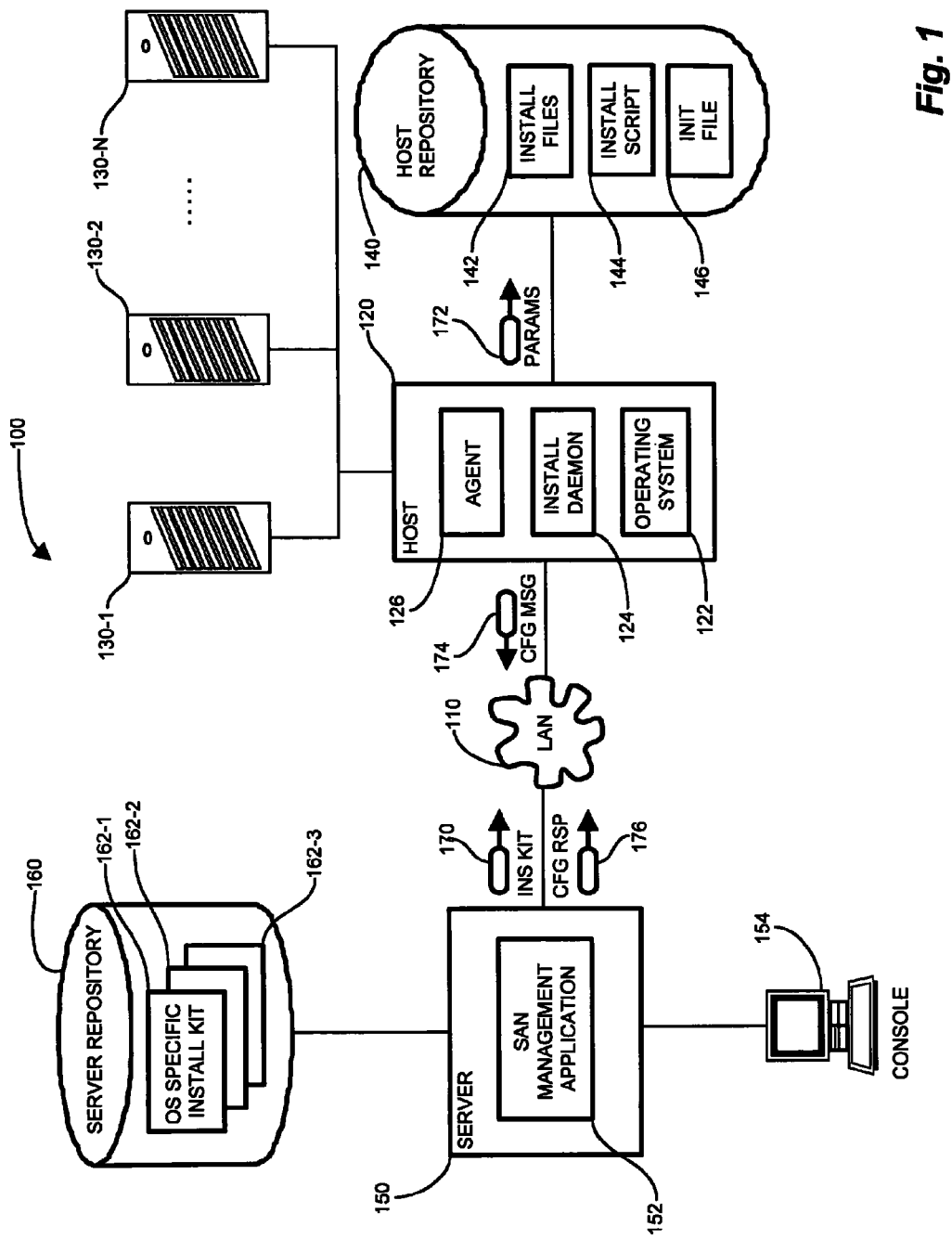
FIG. 1 is a context diagram of an exemplary managed information environment including a storage area network operable for use with configurations discussed herein.

In a large storage area network, installing the agents which run, or execute, on each of the hosts, may be a formidable task. In such a large storage area network, storage arrays are typically accessed via interconnected host devices which manage the requests and responses between the users and the storage arrays. Hosts are computers operable to execute software processes called agents for performing the processing of the requests and responses. Accordingly, each host may run a plurality of agents depending on the type and quantity of the storage arrays connected to it, and the type and volume or requests received by the host. Each host on an agent is installed as an executable file operable to be loaded and executed from a host repository to the system memory on the host. The agents, therefore, expected to run on a particular host define the executable and other support files which are installed on each host.

Configurations of the invention are based, in part, on the observation that conventional agent installation in a large storage area network involves manually copying files depending on the particular operating system employed at each of the hosts, performing a login/authentication sequence at each host, and specifying agent specific parameters concerning the particular host, typically via a script which is also deterministic from the operating system. Accordingly, an agent installation involving a large number of hosts can be a time-consuming, arduous, and error prone task if the improper files are transferred or stored in the wrong location. It would be beneficial to develop an agent install mechanism which allows identification of the hosts for installation, identifying the operating system in use and retrieving the corresponding files, transferring the files according to a common authentication mechanism applicable to all hosts, and automatically responding to an install script to populate the agent specific parameters applicable to each host. In this manner, a human operator need only select from a list of hosts to identify a candidate host set, and initiate the installation, without manually copying, logging in, or responding to an initialization query at each of the candidate hosts for installation.

Accordingly, configurations discussed herein perform SAN agent installation on a plurality of hosts according to a predetermined host candidate install list. The target hosts may employ different operating systems, or platforms, and the server (installer) selectively copies an install kit corresponding to the operating system on the target host (i.e. SAN node). The install kit includes an agent specific install script for identifying agent specific parameters on the target host. The installer initiates and remotely responds to the execution of the install script, or configuration script, in lieu of manual intervention by an operator, to provide the agent specific parameters for the agents being installed on the target host. The execution of the install script generates an agent initialization file for installing the agents in the appropriate locations on the target system. The agent initialization file establishes, for example, folders (i.e. directories) for locating the agent executable files and associated support files, runtime parameters such as a heartbeat (i.e. keep alive) message frequency, and the IP address of the target host, to name several. The agent initialization file, therefore, starts and executes the agents in the install kit, from the appropriate locations and with the agent specific parameters according to the generated agent initialization file. In this manner, a SAN operator need only provide the list of target host names and the installer effects installation and subsequent startup of each of the listed agents without manual intervention.

FIG. 1 is a context diagram of an exemplary managed information environment including a storage area network operable for use with configurations discussed herein. Referring to FIG. 1, briefly, the managed information environment 100 includes a plurality of nodes, or computing devices, interconnected via a storage area network 110. Typical nodes include a host computing device 120 (host) and storage arrays devices 130-1 . . . 130-N (130 generally). The host 120 includes a local repository 140, such as a local hard drive in the host computing device 120, having install files 142 and a configuration file 144. The host 120 further includes an operating system 122, an install daemon 124, and one or more agents 126, and interconnects with a server 150 via the SAN 110. The server 150 includes a SAN management application 152, such as an SNMP based management application, responsive to a console 154 operable by a user or operator (not specifically shown) for managing the storage area network 110 nodes (120, 130). The server 150 couples to a server repository 160, which stores operating system specific install kits 162-1 . . . 162-3 (162 generally) for transmission (shown as bubble 170) and installation on the hosts 120 as install files 142. The install daemon 124 executes an install (configuration) script 144 and sends configuration messages 174 requesting responses. The server 150 sends configuration responses 176 including agent specific parameters 172 for storing in an initialization file 146. The initialization file 146 is employed during individual agent 126 startup, discussed further below in FIGS. 2 and 3. In particular configurations, the server repository 160 also stores information on the various interconnected nodes, or manageable entities, in the storage area network 110 which the management application is operable to manage. Such manageable entities include the hosts 120, and the storage arrays 130-1 . . . 130-N (130 generally), interconnected to the SAN 110 via the host 120.

Figure 2:
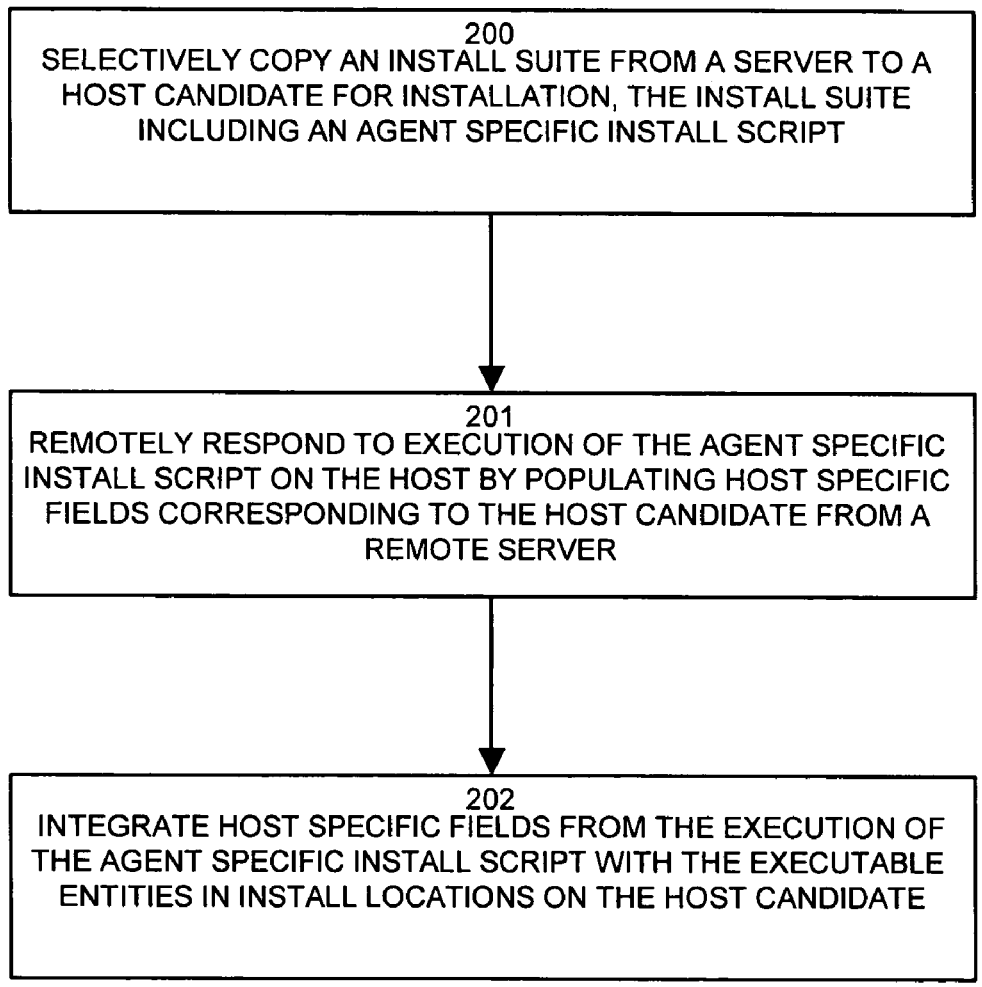
FIG. 2 is a flowchart for agent installation in the storage area network of FIG. 1 as discussed herein.

FIG. 2 is a flowchart for agent installation in the storage area network of FIG. 1 as discussed herein. Referring to FIGS. 1 and 2, in an exemplary arrangement, the system and method for remotely configuring agents 126 in the storage area network 110 includes selectively copying the install suite (kit) 170 to a host candidate 120 for installation, in which the install suite 170 includes an agent specific install script 144, as depicted at step 200. The selected set of hosts 120 typically exhibits a variety of operating systems 122, each requiring a particular set of install files 142, or install suite 170, discussed further below. The server 150, therefore, copies only the correct install kit 170, including the install files 142 and install script 144, for the particular candidate host 120 (host). Typically, each agent 126 or installation has a corresponding executable file, as well as related data files, included in the install files 142. Further, each host 120 employs a configuration script 144 for building an initialization file 146 containing agent specific parameters 172 pertaining to the agents 126 on that particular host 120. Accordingly, the server 150 remotely responds to execution of the agent specific install script 144 by populating host specific fields corresponding to the host candidate 120 from the remote server 150, as shown at step 201. The host 120 then initiates installation by executing the install script 144, which stores executable files, or entities, corresponding to the agents 126 in designated folders, or directories, including integrating host specific fields from the execution of the agent specific install script 144 with the executable entities in install locations on the host candidate, as depicted at step 203. In this manner, the executable install files 142 for each of the agents 126 to be installed are written to appropriate startup locations on the host 120 along with the agent specific parameters resulting from the install script 144 and resulting agent initialization (configuration) file 146. Since types and patterns of support files tend to vary by operating system, the install kit enumerates files employed by each particular OS, which servers to insulate users, for example, from idiosyncrasies of various available Unix platforms.

Figure 3:
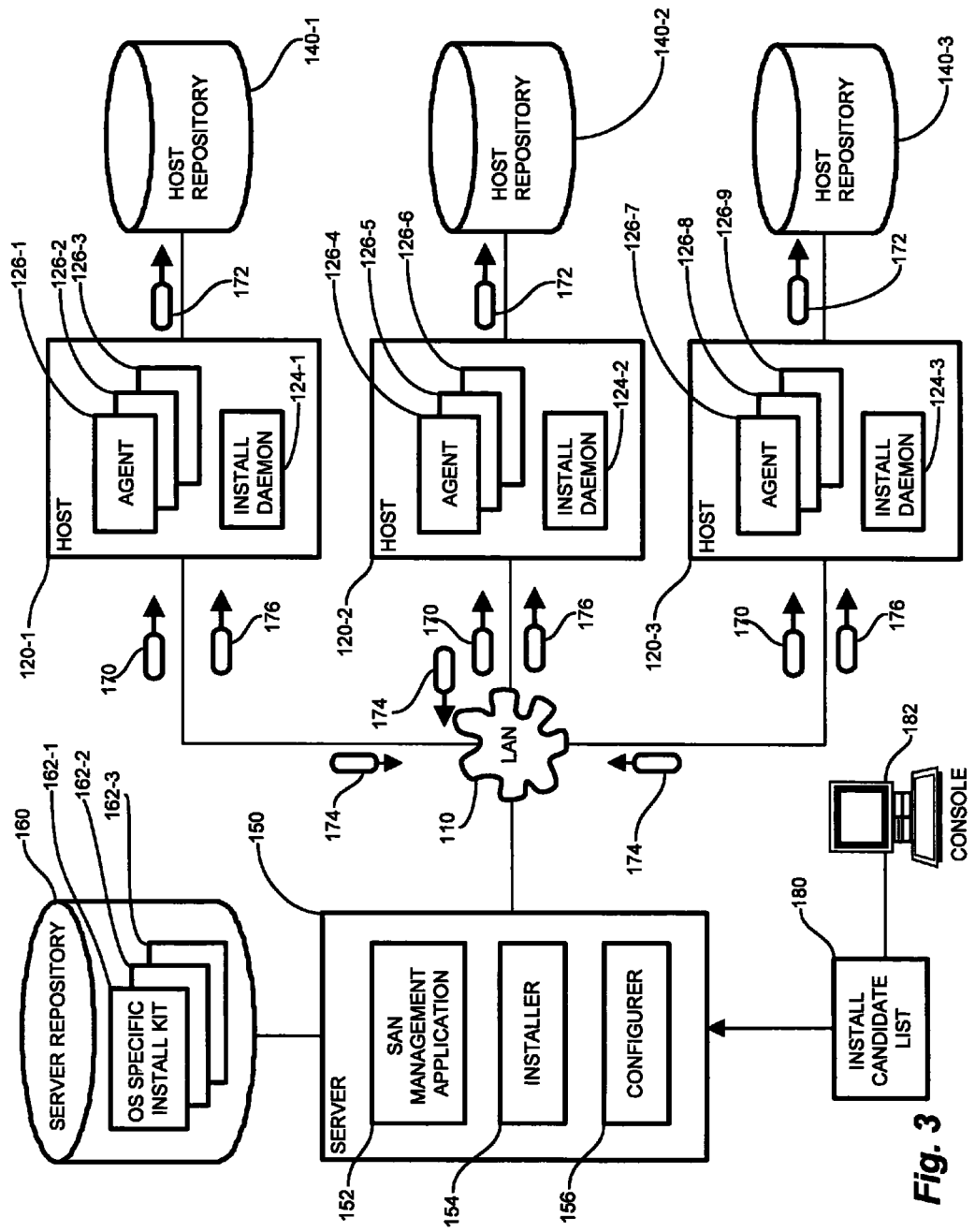
FIG. 3 is a block diagram of a particular configuration of a storage area network as in FIG. 1 operable for agent installation.

FIG. 3 is a block diagram of a particular configuration of a storage area network as in FIG. 1 operable for agent 126 installation. Referring to FIGS. 1 and 3, the server 150 typically connects to a plurality of hosts 120-1 . . . 120-N (120 generally) interconnected via the SAN 110. Each of the hosts 120 also has a host repository 140-1 . . . 140-N (140 generally), such as a local hard drive, having files or other entities corresponding to the install files 142, the configuration script 144, and initialization file 146. The server 150 further includes an installer 154 and a configurer 156, both responsive to the SAN management application 152, for installing the OS specific install kits 162. In operation, a user or operator enters an install candidate list 180 via the console 182. The install candidate list indicates the hosts 120 upon which the installer 154 will install the OS specific install kits 162. Accordingly, the installer 154 transmits the install kits 170 to the individual host repositories 140 for each of the hosts 120 in the install candidate list 180. The configurer 156 subsequently responds to the configuration messages 174 with configuration responses 176 including agent specific parameters 174 for generating the initialization file 146.

Figure 4:
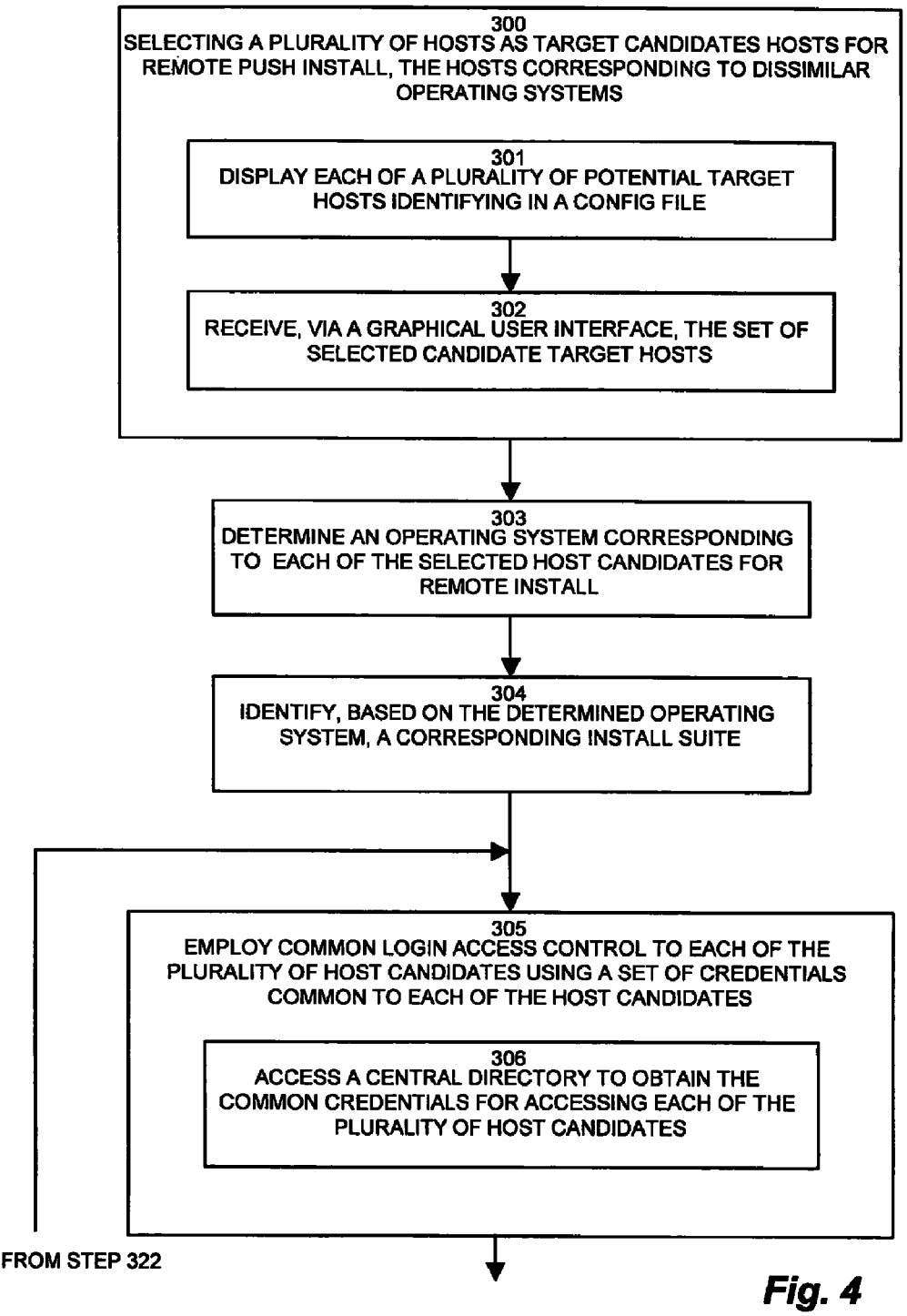
FIGS. 4-6 are a flowchart depicting installation on a plurality of hosts in the storage area network of FIG. 3.
Figure 5:
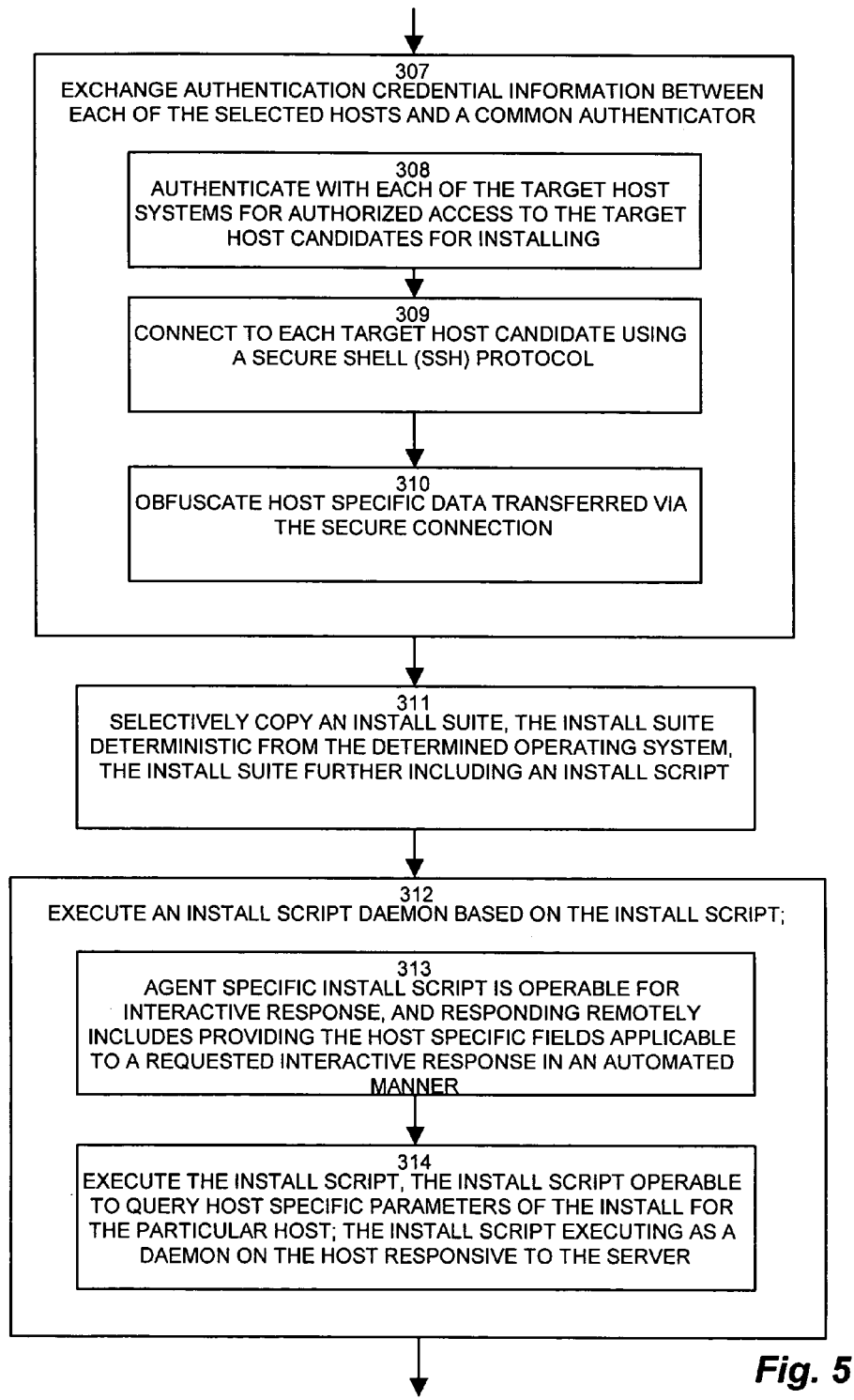
Figure 6:
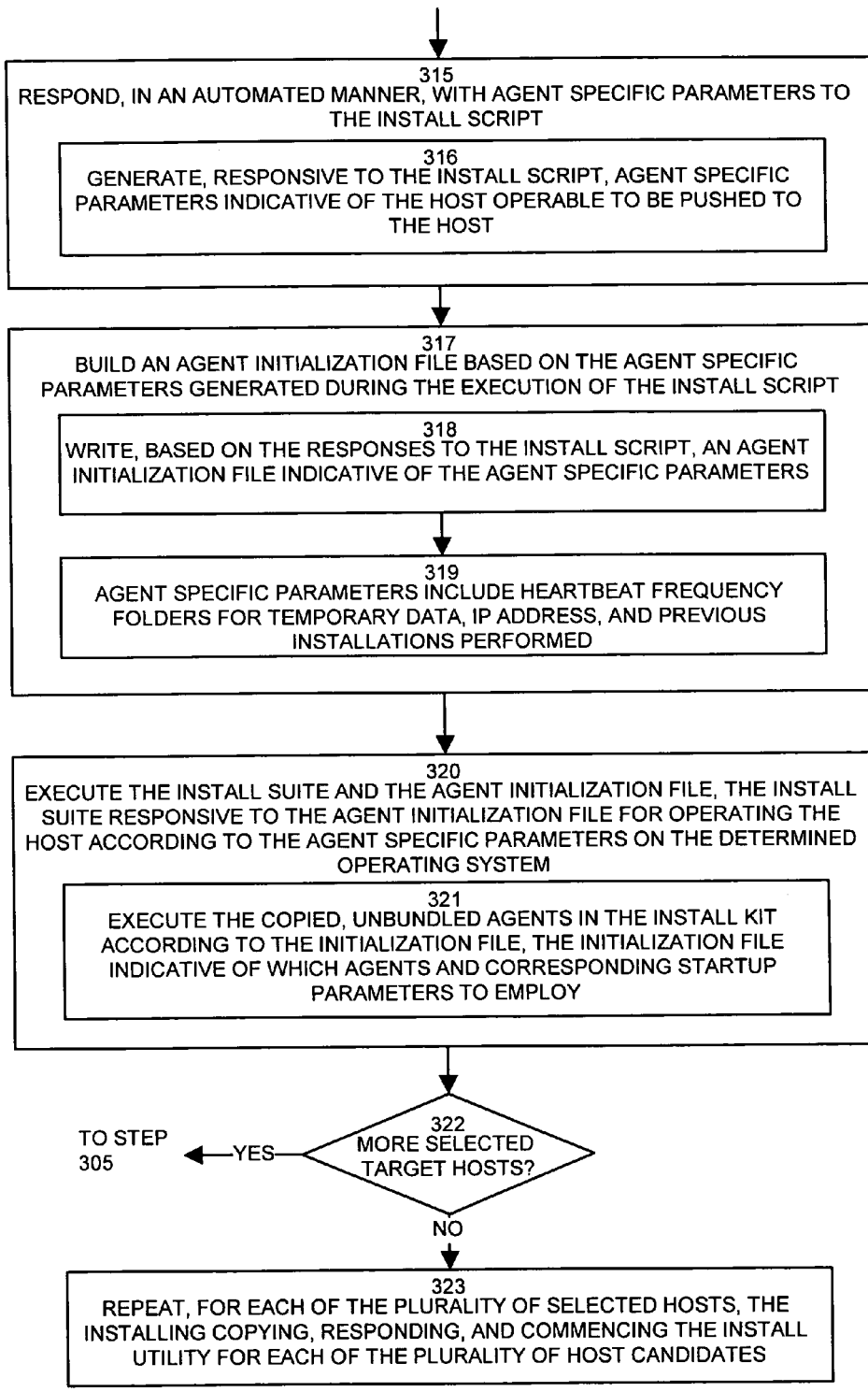

FIGS. 4-6 are a flowchart depicting installation on a plurality of hosts 120 in the storage area network 100 of FIG. 3. Referring to FIGS. 1 and 3-6, a user or operator employs the console 182 to enter or select the install candidate list 180, as depicted at step 300. A graphical user interface (GUI), file list, or other input mechanism may assist entering the install candidate list 180. For example, the install candidate list 180 may include a set of nodes identified during a discovery process or operation, from which a point and click checkoff box selection may be used. Such selection of a plurality of hosts as target candidates hosts 120 involves selecting a set of hosts 120 for remote push install, the hosts 120 corresponding to dissimilar operating systems (OSs) 122, as shown at step 301. The server 150 displays, via the console 182 GUI, each of a plurality of potential target hosts 120 identified in a previously generated configuration or discovery file, as depicted at step 302. The console 182 then receives, via the graphical user interface, the set of selected candidate target hosts 120 for building the install candidate list 180, as depicted at step 303.

Upon receipt of the install candidate list 180 for push install, the SAN management application 152 determines the operating system 122 corresponding to each of the selected host candidates 120 for remote install, as shown at step 303. The installed operating system 122 may be determined, for example, from discovery data. The SAN management application 152 identifies, based on the determined operating system 122, a corresponding install kit 162, as shown at step 304. Depending on the operating system 122 of the particular host 120, such as Windows, Linux, etc., the corresponding OS specific install kit 162 is expected on the host 120.

The SAN management application 152 employs a remote login operation to each of the hosts 120 listed in the install candidate list 180 to initiate the remote push install. Accordingly, the server 150 employs common login access control to each of the plurality of host candidates 120 using a set of credentials common to each of the host candidates 120, as depicted at step 305. The SAN management application 152 accesses, via the installer, a central directory to obtain the common credentials for accessing each of the plurality of host candidates 120, as shown at step 306. In this manner, common authentication credentials are applicable to each of the hosts 120 in the install candidate list 180, therefore avoiding separate sets of login and authentication information for each of the candidate hosts 120.

The installer 154, therefore, invokes authentication capability for remote push install by exchanging authentication credential information between each of the selected hosts 120 and a common authenticator, such as a common key or directory, as depicted at step 307. Since the installer 154 need only maintain a single login sequence for each remote host 120, the installation avoids enumerating multiple different login scenarios and corresponding credentials (i.e. passwords, keys, etc.) for each host. The installer 154 authenticates itself with each of the target host systems 120 for authorized access to the target host 120 for installing the agent 126 executable files and other install files 142, as disclosed at step 308. In the exemplary configuration discussed herein, the installer 154 connects to each target host candidate 120 using a secure shell (SSH) protocol, as depicted at step 309. The installer 154 therefore obfuscates or encrypts host specific data transferred via the secure connection established to each respected host 120, as shown at step 310.

After logging in to the remote host 120, the installer 154 selectively copies the applicable install kit 162, in which the install kit, or suite, is deterministic from the determined operating system 122, as depicted at step 311. Further, the install suite further including the configuration, or install script 144, operable to generate the initialization file 146, now discussed further.

After copying the install script 144, the host 120 executes an install script daemon 124 based on the install script 144, as shown at step 312. The install script daemons 124-1.124-N (124 generally) execute the install script 144 to receive the host specific operating parameters 172 and generate the agent specific initialization file 146 containing the parameters 172. Accordingly, the copied install script 144 is operable for interactive response, and the configurer 156 at the server 150 responds remotely to the install script 144 execution by providing the host specific fields 172 applicable to a requested interactive response in an automated manner, as shown at step 313. During execution of the install script 144 on the host 120, the install script 144 queries host specific parameters 172 of the install for the particular host 120 in which the install script 144 executes as the daemon 124 on the host 120, responsive to the configurer 156 on the server 150, as depicted at step 314, and is operable to respond with the configuration responses 172 to the daemon 124. The configurer 156 therefore responds to the execution of the install script 144, from the server 150, in an automated manner, with the agent specific parameters 172, as depicted at step 315. Accordingly, the configurer 156 generates or obtains the agent specific parameters 172 indicative of the host 120 and operable to be pushed to the host 120 by the configurer, as shown at step 316.

Upon completion of the install script 144 execution and corresponding responses 176 received by the install daemon 124, the host builds the agent initialization file 146 based on the agent specific parameters 174 generated during the execution of the install script 144, as shown at step 317. The host 120 writes, based on the responses 176 to the install script 144, the agent initialization file 146 indicative of the agent specific parameters 172 applicable to the particular host, as depicted at step 318. Such agent specific parameters 172 include, for example, heartbeat frequency folders for temporary data, IP address, and a history of previous installations performed, as shown at step 319. The initialization file 146 resides in the host repository 140 pending host install suite execution, now described in further detail.

The host 120 executes the install files 142 included in the install suite (kit) 162 along with the agent initialization file 146, in which the install suite 162 is responsive to the agent initialization file 146 for operating the host 120 according to the agent specific parameters 172 on the determined operating system 122, depicted at step 320. Execution includes executing the copied, unbundled agents 126 in the install kit 142 (files) according to the initialization file 146, in which the initialization file 146 is indicative of which agents 126 and corresponding startup parameters 172 to employ, as obtained by the install daemon 124, shown at step 321.

The SAN management application 152 performs a check, as depicted at step 322, to determine if there are more hosts 120 remaining in the install candidate list 180. If so, then control reverts to step 305 for completing the installation on the remaining hosts 120. Accordingly, the SAN management application 152 repeats, for each of the plurality of selected hosts 120, the installing copying, responding, and commencing the install utility for each of the plurality of host candidates 120, as depicted at step 323.

The system and method for remotely configuring agents in a storage area network disclosed herein may encompass a variety of alternate deployment environments. In a particular configuration, as indicated above, the exemplary SAN management application discussed may be the EMC Control Center (ECC) application, marketed commercially by EMC corporation of Hopkinton, Mass., assignee of the present application.

Those skilled in the art should readily appreciate that the programs and methods for storage area network simulation as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for remotely configuring agents in a storage area network has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:
1. A computer implemented method for remotely configuring agents in a storage area network comprising:
selectively copying an install suite to each host candidate of a plurality of host candidates for installation, the install suite including an agent specific install script;

employing common login access control for authenticated access to each of the plurality of host candidates using a set of credentials common to each of the host candidates, authenticating performed by exchanging the credentials between a remote installer and each of the host candidates;

accessing a central directory to obtain the common credentials for accessing each of the plurality of host candidates, the credentials including a common authenticator configured for performing a common login sequence for each host candidate such that multiple different login scenarios are avoided;

remotely responding to execution of the agent specific install script by populating host specific fields corresponding to the host candidate from a remote server;

commencing an agent install utility to install executable entities from the install suite to the host candidate, installing including integrating host specific fields from the execution of the agent specific install script with the executable entities in install locations on the host candidate; and repeating the copying, responding, and commencing the agent install utility for each of the plurality of host candidates.

2. The method of claim 1 wherein selectively copying further comprises:
determining an operating system corresponding to the host candidate; identifying, based on the determined operating system, a corresponding install suite; and
authenticating with each of the target host systems for authorized access to the target host candidates for installing.

3. The method of claim 2 wherein authenticating further comprises:
connecting to each target host candidate using a secure shell (SSH) protocol; and
obfuscating host specific data transferred via the secure connection, the host specific data including authentication information operable to allow remote access to the host.

4. The method of claim 3 wherein the agent specific install script is operable for interactive response, and responding remotely includes providing the host specific fields applicable to a requested interactive response in an automated manner.

5. The method of claim 1 wherein the authentication provides obfuscating host specific data transferred by a secure connection established to each respective host.

6. The method of claim 5 wherein the agent specific install script installs a SAN agent responsive to a SAN management application, the agent being an executable entity for managing SAN entities via the SAN management application, further comprising:
identifying the operating system (OS) of the host candidate;
copying a particular OS specific install kit based on the identified OS; and
receiving the host specific fields from the remote server, the host specific fields indicating, for the particular OS, a heartbeat polling frequency, IP address of the host candidate, a directory structure including folders, and a history of previous operations.

7. The method of claim 5 further comprising exchanging a sequence of install messages, the install sequence comprising:
receiving an OS specific install kit from the server to the host candidate based on a host candidate list;
transmitting configuration messages requesting responses for OS specific parameters; and
receiving, responsive to the configuration messages, configuration responses including the OS specific parameters having agent specific parameters based on the received install kit.

8. The method of claim 1 wherein the common login access further comprises a remote push install by initiating a remote login using the common credentials for the plurality of devices.

9. The method of claim 1 further comprising repeating the remote login using the common authenticator provided in the credentials for each of a plurality of remote devices.

10. A method for remotely installing an agent on a plurality of remote hosts comprising:
determining an operating system corresponding to each host candidate of the plurality of host candidates for remote install;
employing common login access control for authenticated access to each of the plurality of host candidates using a set of credentials common to each of the host candidates, authenticating performed by exchanging the credentials between a remote authenticator and each of the host candidates;
accessing a central directory to obtain the common credentials for accessing each of the plurality of host candidates, the credentials including a common authenticator configured for performing a common login sequence for each host candidate such that multiple different login scenarios are avoided;
selectively copying an install suite, the install suite deterministic from the determined operating system, the install suite further including an install script; executing an install script daemon based on the install script;
generating, responsive to the install script, agent specific parameters indicative of the host operable to be pushed to the host;
building an agent initialization file based on the agent specific parameters generated during the execution of the install script;
executing the install suite and the agent initialization file, the install suite responsive to the agent initialization file for operating the host according to the agent specific parameters on the determined operating system; and
repeating the copying and executing the install suite for each of the plurality of host candidates.

11. The method of claim 10 wherein the agent specific parameters include heartbeat frequency folders for temporary data, IP address, and previous installations performed.

12. The method of claim 11 further comprising, repeating, for each of the plurality of selected hosts, the copying of the install suite, executing the install script, generating agent specific parameters, and building the agent initialization file.

13. The method of claim 12 further comprising:
displaying each of a plurality of potential target hosts; and
receiving, via a graphical user interface, the set of selected candidate target hosts.

14. A method for remotely installing agents on hosts in a storage area network comprising:
selecting a plurality of host candidates for remote push install, the host candidates corresponding to dissimilar operating systems;
authenticating capability for remote push install by exchanging authentication credential information between each of the selected hosts and a common authenticator, the credentials including a common authenticator configured for performing a common login sequence for each host candidate such that multiple different login scenarios are avoided, further comprising:
exchanging the credentials between a remote installer and each of the host candidates;
employing common login access control to each of the plurality of host candidates using a set of credentials common to each of the host candidates; and
accessing a central directory to obtain the common credentials for accessing each of the plurality of host candidates;
identifying an operating system corresponding to each of the selected host candidates;
selectively copying an install suite, the install suite including an install script, to each host in the set of host candidates;
executing, on the selected host, the install script, the install script operable to query host specific parameters of the install for the particular host; the install script executing as a daemon on the host responsive to the server;
responding, from the server, in an automated manner, with agent specific parameters to the install script;
writing, based on the responses to the install script, an agent initialization file indicative of the agent specific parameters;
executing the copied, unbundled agents in the install kit according to the initialization file, the initialization file indicative of which agents and corresponding startup parameters to employ; and
repeating the copying, responding, and executing for each of the plurality of host candidates.

15. A storage area network server having encoded instructions that, when executed by a processor, cause the server to perform a method for remotely configuring agents in a storage area network comprising:
a storage area network application having an installer operable to selectively copy an install suite to a host candidate from a plurality of host candidates for installation, the install suite including an agent specific install script;
a configurer operable to remotely respond to execution of the agent specific install script by populating host specific fields corresponding to the host candidate from a remote server, the SAN management application operable to commence an agent install utility to install executable entities from the install suite to the host candidate, installing including integrating host specific fields from the execution of the agent specific install script with the executable entities in install locations on the host candidate; and
an authenticator for employing common login access control for authenticated access to each of the plurality of host candidates using a set of credentials common to each of the host candidates,
authenticating performed by exchanging the common credentials between a remote installer and each of the host candidates, and
accessing a central directory to obtain the common credentials for accessing each of the plurality of host candidates,
the common credentials including a common authenticator configured for performing a common login sequence for each host candidate such that multiple different login scenarios are avoided,
the configurer further operable for repeating the copying, responding, and commencing the agent install utility for each of the plurality of host candidates.

16. The server of claim 15 wherein the SAN management application is further operable to:
select a plurality of hosts as target candidates hosts; and
repeat the copying, responding, and commencing the install utility for each of the plurality of host candidates.

17. The server of claim 16 wherein the installer is operable to:
employ common login access control to each of the plurality of host candidates using a set of credentials common to each of the host candidates; and
access a central directory to obtain the common credentials for accessing each of the plurality of host candidates.

18. The server of claim 17 wherein the installer is further operable to:
determine an operating system corresponding to the host candidate;
identify, based on the determined operating system, a corresponding install suite; and
authenticate with each of the target host systems for authorized access to the target host candidates for installing.

19. The server of claim 18 wherein the installer is further operable to:
connect to each target host candidate using a secure shell (SSH) protocol; and
obfuscate host specific data transferred via the secure connection.

20. The server of claim 19
wherein the configurer is further operable to interactively respond to the agent specific install script; and
wherein the remote response includes host specific fields applicable to a requested interactive response in an automated manner.

21. A computer program product having a non-transitory computer readable storage medium operable to store computer program logic embodied in a set of computer readable instructions in a storage area network (SAN) management application for remotely configuring agents in then storage area network comprising:
computer program code for selecting a plurality of hosts as target candidate hosts;
computer program code for selectively copying an install suite to each host candidate in the plurality of host candidates for installation, the install suite including an agent specific install script;
computer program code for authenticating by exchanging a set of common credentials between a remote authenticator and each of the selected hosts;
computer program code for employing common login access control to each of the plurality of host candidates using the set of credentials common to each of the host candidates, the authentication for obfuscating host specific data transferred by a secure connection established to each respective host;
computer program code for accessing a central directory to obtain the common credentials for accessing each of the plurality of host candidates;
computer program code for remotely responding to execution of the agent specific install script by populating host specific fields corresponding to the host candidates from a remote server, the agent specific install script configured to install a SAN agent responsive to a SAN management application, the agent being an executable entity for managing SAN entities via the SAN management application, further comprising:
computer program code for identifying the operating system (OS) of the host candidate;

computer program code for copying a particular OS specific install kit based on the identified OS; and computer program code for receiving the host specific fields from the remote server, the host specific fields indicating, for the particular OS, a heartbeat polling frequency, IP address of the host candidate, a directory structure including folders, and a history of previous operations;

computer program code for commencing an agent install utility to install executable entities from the install suite to the host candidates, installing including integrating host specific fields from the execution of the agent specific install script with the executable entities in install locations on the host candidates; and computer program code for repeating the copying, responding, and commencing the install utility for each of the plurality of host candidates.

22. A storage area network server having encoded instructions that, when executed by a processor, cause the server to perform a method for remotely configuring agents in a storage area network (SAN) management application comprising:

means for determining an operating system corresponding to a host candidate of a plurality of host candidates for installation;

means for identifying, based on the determined operating system, a corresponding install suite;

means for authenticating with each of the target host systems for authorized access to the target host candidates for installing, the means for authenticating further comprising:

means for employing common login access control to each of the plurality of host candidates using a set of credentials common to each of the host candidates;

means for authenticating by exchanging a set of common credentials between a remote authenticator and each of the host candidates, the authentication for obfuscating host specific data transferred by a secure connection established to each respective host; and means for accessing a central directory to obtain the common credentials for accessing each of the plurality of host candidates;

means for selectively copying an install suite to each host candidate in the plurality of host candidates, the install suite including an agent specific install script;

means for remotely responding to execution of the agent specific install script by populating host specific fields corresponding to the host candidate from a remote server; and means for commencing an agent install utility to install executable entities from the install suite to the host candidate, installing including integrating host specific fields from the execution of the agent specific install script with the executable entities in install locations on the host candidate, further comprising means for exchanging a sequence of install messages, the install sequence comprising:

receiving an OS specific install kit from the server to the host candidate based on a host candidate list;

transmitting configuration messages requesting responses for OS specific parameters; and receiving, responsive to the configuration messages, configuration responses including the OS specific parameters having agent specific parameters based on the received install kit.

* * * * *